US007146356B2

(12) United States Patent
Choi et al.

(10) Patent No.: US 7,146,356 B2
(45) Date of Patent: Dec. 5, 2006

(54) REAL-TIME AGGREGATION OF UNSTRUCTURED DATA INTO STRUCTURED DATA FOR SQL PROCESSING BY A RELATIONAL DATABASE ENGINE

(75) Inventors: Arthur Choi, Germantown, MD (US); Todd L. Leyba, Montgomery Village, MD (US); Beate Porst, San Jose, CA (US); Amit Radheshyam Somani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/394,842

(22) Filed: Mar. 21, 2003

(65) Prior Publication Data

US 2004/0186826 A1  Sep. 23, 2004

(51) Int. Cl.
*G06F 17/30* (2006.01)
(52) U.S. Cl. .......................................... 707/3; 707/102
(58) Field of Classification Search .............. 707/1–10, 707/100–104.1, 200–206; 705/14
See application file for complete search history.

(56) References Cited

U.S. PATENT DOCUMENTS

| 5,729,730 | A |   | 3/1998  | Wlaschin et al. ............... 707/3 |
| 5,826,258 | A |   | 10/1998 | Gupta et al. .................... 707/4 |
| 5,832,467 | A |   | 11/1998 | Wavish ......................... 706/13 |
| 5,893,087 | A |   | 4/1999  | Wlaschin et al. ............... 707/3 |
| 5,983,214 | A |   | 11/1999 | Lang et al. ..................... 707/1 |
| 5,987,449 | A |   | 11/1999 | Suciu ............................. 707/3 |
| 5,995,943 | A | * | 11/1999 | Bull et al. ..................... 705/14 |
| 5,999,926 | A |   | 12/1999 | Suciu ............................. 707/5 |
| 6,052,686 | A |   | 4/2000  | Fernandez et al. .......... 707/100 |
| 6,282,537 | B1| * | 8/2001  | Madnick et al. ................ 707/4 |
| 6,438,540 | B1| * | 8/2002  | Nasr et al. ...................... 707/3 |
| 6,456,737 | B1|   | 9/2002  | Woodfill et al. ............. 382/154 |
| 6,581,062 | B1| * | 6/2003  | Draper et al. ............... 707/100 |
| 6,647,391 | B1| * | 11/2003 | Smith et al. ................. 707/100 |

(Continued)

FOREIGN PATENT DOCUMENTS

WO    WO 96/30845    10/1996

(Continued)

OTHER PUBLICATIONS

Spertus, E et al.; "Just-In-Time Databases and the World Wide Web", *Proceedings of the Seventh International Conference on Information and Knowledge Management*, pp. 30-37 XP002292006, Retrieved on Aug. 9, 2004 from http://delivery.acm.org/10.1145/290000/288638/p30-spertus.pdf?key1=288638&key2=4255122901&coll=Portal&dl=GUIDE&FID=25625200&CFTOKEN=21019581.

(Continued)

*Primary Examiner*—Jeffrey Gaffin
*Assistant Examiner*—Yicun Wu
(74) *Attorney, Agent, or Firm*—Min, Hsieh & Hack, LLP (57) ABSTRACT

Method, system, and program product for searching unstructured data. The unstructured data, as text data or image data, is searched by first searching the unstructured data through an extended search broker. The extended search broker has intermediary components between a search requestor and a search agent for unstructured data searching. The search agent returns the search results to the broker for aggregation. The broker aggregates the search results and returns the search results to a wrapper. The wrapper then takes result attributes from the aggregated search results and makes the attributes available, e.g., as one or more columns in a nickname table. This nickname table is searchable by a relational database using a structured query language.

26 Claims, 2 Drawing Sheets

U.S. PATENT DOCUMENTS

| | | | |
|---|---|---|---|
| 2002/0078201 A1 | 6/2002 | Gvily | 709/225 |
| 2002/0128998 A1 | 9/2002 | Kil et al. | 707/1 |
| 2002/0129011 A1 | 9/2002 | Julien | 707/3 |
| 2002/0156817 A1 | 10/2002 | Lemus | 707/531 |

FOREIGN PATENT DOCUMENTS

| | | |
|---|---|---|
| WO | WO 97/37314 | 10/1997 |
| WO | WO 98/08170 | 2/1998 |
| WO | WO 98/08171 | 2/1998 |
| WO | WO 02/073468 A1 | 9/2002 |
| WO | WO 02/082318 A2 | 10/2002 |

OTHER PUBLICATIONS

Guan T et al.; Structure-Based queries over the World Wide Web, *Conceptual Modleing-Er. International Conference on Conceptual Modeling*, XX, XX, Nov. 16, 1998, pp. 102-120, XP001130882.

Florescu, D et al.; "Database Techniques for the World-Wide-Web: A Survey", *ACM Sigmod Record*, Online, vol. 23, Sep. 1998, (Sep. 1988), pp. 59-74, XP002292007, ACM Press, New York, NY, USA. Retrieved on Aug. 9, 2004 from: http://delivery.acm.org/10.1145/300000/290605/P059.pdf?key1=290605&key2=7885122901&coll=Portal1&dl=GUIDE&CFID=25625200&CFTOKEN=21019581.

* cited by examiner

REAL-TIME AGGREGATION OF UNSTRUCTURED DATA INTO STRUCTURED DATA FOR SQL PROCESSING BY A RELATIONAL DATABASE ENGINE

FIELD OF THE INVENTION

Our invention relates to methods of searching (i.e., querying) unstructured data stored in a database, including converting an SQL query into a proper query for unstructured data. A further aspect of our invention is translating an external SQL access of the type identified with structured relational databases into an internal access to unstructured databases or files, and translation of the SQL external query format into an intermediate or internal query format. The method, system, and program product of our invention is especially applicable to text searching and indexing,

BACKGROUND OF THE INVENTION

Accessing structured data with SQL is quite different from the full text search of unstructured data such as documents on the web. Structured data in the relational model is maintained in two-dimensional tables as rows and columns. Each row in a table represents an instance of an object while each column represents the attributes of the object. A column is given a symbolic name and is assigned a specific data type (such as integer, date, etc.). Integrity constraints can be applied to columns to further indicate valid values.

Because column values are named and represented in a consistent format, you can select rows very precisely, based on their contents. This capability is especially helpful in dealing with numeric data. You can join together data from different tables based on matching column values. You can do useful types of analysis, such as listing objects in one table that are missing from a related table (or that are present in a related table, or that have specific attributes). You can extract specific rows of interest from a large table, regroup them, and generate simple statistics on them.

By contrast, unstructured data is not always organized in a consistent and predictable manner. Unstructured data is stored in a variety of shapes and forms, distributed throughout the enterprise, and managed by the most appropriate software for the task at hand. The data tends to be recorded in free text form (for example, text contained in e-mails, notes, and documents) with little or no metadata codified into fields. As a consequence, searching is less parametric and more keyword-based in nature. Search results derive more from what "matches" a given set of keywords than from computational criteria.

Yet it is desirable to query unstructured data in a structured way to add still more value to the results set. It would be advantageous to treat the web as a relational database, one that could be queried using standard SQL. Just as importantly, it would also be advantageous to be able to treat a plurality of heterogeneous and unstructured data sources uniformly through an SQL interface, thus removing the ambiguity of their integration.

A conventional approach to solving these problems would be to extract the desired data from the unstructured data sources, apply any necessary conversions to the data and then place the so-converted data into a relational database for later processing. Indeed this warehousing approach is a common method used today for a variety of applications. However, this approach does not address the overarching issue of making unstructured data available for parametric querying.

SUMMARY OF THE INVENTION

We address these problems by a method, system, and program product for parametric searching unstructured data. The unstructured data, as text data or image data, is searched by first searching the unstructured data through an Extended Search broker. The extended search broker has intermediary components between a search requestor and a search agent for unstructured data searching. The search agent returns the search results to the broker for aggregation. The broker aggregates the search results and returns them to the wrapper. The wrapper then takes attributes from the aggregated search result and makes them available as one or more columns in a nickname table. This nickname table is searchable by a relational database using a structured query language (SQL).

One aspect of our invention is a method of searching unstructured data. The method comprises searching the unstructured data through an extended search broker. The extended search broker has intermediary components between a search requester and a search agent for unstructured data searching. The search agent returns the search results from the search agent to the broker for aggregating the search results to a wrapper. Next, the result attributes are entered into a nickname table, where the nickname table is searchable by a relational database using a structured query language.

A further aspect of our invention is a computer system having an unstructured data search system, and a structured data search engine, logically or virtually joined by a nickname table. The computer system is adapted to initiate a search of unstructured data initiated with the structured data search engine. The unstructured data search system includes an extended search broker and a search agent for unstructured data searching. The unstructured data search system receives search results from the search agent and sends the search results and search results attributes to the extended search broker for aggregation into a wrapper. The computer system is adapted to enter the wrapper attributes into the nickname table. The structured data search engine is adapted to conduct searches of search results attributes in the nickname table.

A still further aspect of our invention is a computer program product comprising computer readable code to program and configure a computer system to search unstructured data through an unstructured data search system that includes an extended search broker and a search agent for unstructured data searching. The program product further includes code capable of causing search results and search result attributes from the search agent to be returned to the broker for aggregation, and to aggregate the search results and search result attributes in a wrapper. The code then enters the search result attributes in a nickname table, that is, as one or columns in a nickname table, where the nickname table is searchable by a relational database using a structured query language to search unstructured data.

According to our invention unstructured data may be searched through the combination of a federated relational database engine and an extended search engine, exemplified by the IBM DB2 Federated Database and the IBM Lotus Extended Search, respectively. Together the combination of a federated relational database engine and an extended search engine provide a relational interface to unstructured data that is distributed throughout the enterprise.

RDBMS federation provides an extensible architecture by which both internal and external developers can write wrappers to integrate external data sources. A federated RDBMS wrapper is the module that encapsulates (or wraps) the necessary native API calls to retrieve data from the foreign server. The wrapper is activated through callbacks at various points in the SQL processing cycle when data in its associated nickname table is referenced for processing the query over the remote data sources.

A nickname table is a special kind of RDBMS table used specifically for federation. It does not contain persistent data but rather is populated with data by the wrapper on demand. In this context the nickname table is a virtual table—not really existing in the physical sense but still supporting most if not all table operations that can be expressed in an SQL expression.

An extended search engine, such as IBM Lotus Extended Search, is a product that "extends" the standard capabilities of other search products by allowing a user to search and retrieve all types of information, not just data that is managed by the hosting software. An extended search engine is based on a brokered search technology that provides for efficient, parallel searching of thousands of data sources distributed throughout the enterprise. Extended search engine agents perform remote searches in the native grammars of the backend database systems. The agents return results to the broker for aggregation and delivery to the original caller—in this case the extended search engine wrapper.

By integrating these two technologies as described herein, several benefits are realized. First, unstructured data from a diverse set of data source types is made available in real time to the RDBMS engine through loading, including just-in-time loading, of the extended search engine nickname tables. By this expedient, data is now current and up-to-date. While other federated wrappers provide current data for a single source, only the extended search engine wrapper enables this capability for multiple data sources at a time. In this way the data received by the extended search engine wrapper is presented as a single normalized data set even though multiple sources were involved in its formation.

A second benefit is that the data remains distributed throughout the enterprise logically or virtually closest to where the work is performed. The extended search engine, and not the relational database engine, is responsible for the searching of thousands of data sources stored in different locations. The extended search wrapper used in conjunction with the extended search broker acts as a gateway to this vast amount of unstructured information.

A third benefit is the ability to apply relational concepts against the aggregate of unstructured information. With an extended search engine alone it is not possible to relate results received from one source with results received from other discrete sources in order to derive a subordinate results set. For example it is not possible to join together data from different sources based on matching field values. Extended search engines only perform aggregation (analogous to a UNION query in SQL) on the returned data to produce a single result set. But, once the data is made available to the nickname table through the extended search engine wrapper, the data is free to be joined by the RDBMS engine with any other table in the database, including other nickname tables.

This capability has profound implications. By configuring a nickname table for each of the different types of data that can be retrieved by an extended search engine using concepts of our invention, it is now possible to use the power of the relational engine to easily integrate that data outside of its hosting environment.

THE FIGURES

Certain embodiments and exemplifications of the invention are illustrated in the FIGURES appended hereto.

FIG. 1 illustrates the various hardware and software platforms, which may be utilized in the practice of the invention. Illustrated are two end user clients, one connected to a data server through the World Wide Web and a web server, and the other connected to the data server through a local area network. The web server is connected to two relational database management systems, and to an extended search server, which is in turn connected to two unstructured databases.

DETAILED DESCRIPTION

Our invention facilitates searching unstructured data through a relational database management system using a structured query language. The invention comprises searching unstructured data using a structured query language and a relational data base management system through an extended search broker. The extended search broker has intermediary components between a search requester and a search agent for unstructured data searching. The search agent returns its search results to the extended search broker for aggregating the search results in a wrapper having structured query language searchable attributes. The wrapper attributes are entered into a nickname table, where the nickname table is searchable by a relational database using a structured query language.

A further aspect of our invention is a computer system having at least two search engines, one an unstructured data search engine, and the other a structured data search engine. The search engines are logically, that is, virtually, joined by a nickname table. The computer system is adapted to conduct searches of unstructured data through the synergistic interaction through a nickname table of the structured data search engine and the unstructured data search engine.

A still further aspect of our invention is a computer program product comprising computer readable code to program and configure a computer system to search unstructured data from a relational database management system for structured data through an unstructured data search system including an extended search broker that has intermediary components between a search requester and a search agent for unstructured data searching. The program product further includes code capable of causing search results from the search agent to be returned to the broker for aggregation, and to aggregate the search results and search result attributes in a wrapper. The code then enters the result attributes in a nickname table, where the nickname table is searchable by a relational database using a structured query language to search unstructured data.

The Integrated System of a Federated Relational Database Management System and an Extended Search System According to our invention unstructured data is searched through the combination and interaction of a federated relational database engine and an extended search engine, exemplified, respectively, by the IBM DB2 Federated Database and the IBM Lotus Extended Search. Together the combination of a federated relational database engine and an extended search engine provide a relational interface to unstructured data that may be distributed throughout the enterprise.

RDBMS federation provides an extensible architecture by which both internal and external developers can write wrappers to integrate external data sources. A federated RDBMS wrapper is the module that encapsulates (that is, wraps) the necessary native API calls to retrieve data from the foreign server. The wrapper is activated through callbacks at strategic points in the SQL processing cycle when data in its associated nickname table is referenced.

A nickname table is a special kind of RDBMS table used specifically for database federation. It does not contain persistent data but rather is populated with data by the wrapper on demand. In this context the nickname table is a virtual table—not really existing in the physical sense but still supporting most if not all table operations that can be expressed in an SQL expression.

An extended search engine, such as IBM Lotus Extended Search, is a product that "extends" the standard capabilities of other search products by allowing a user to search and retrieve all types of information, not just data that is managed by the hosting software. An extended search engine is based on a brokered search technology that provides for efficient, parallel searching of thousands of data sources distributed throughout the enterprise. Extended search engine agents perform remote searches in the native gram mars of the backend database systems. The agents return results to the broker for aggregation and delivery to the original caller—in this case the extended search engine wrapper.

Certain embodiments and exemplifications of the invention are illustrated in the FIGURES appended hereto.

Figure 1:
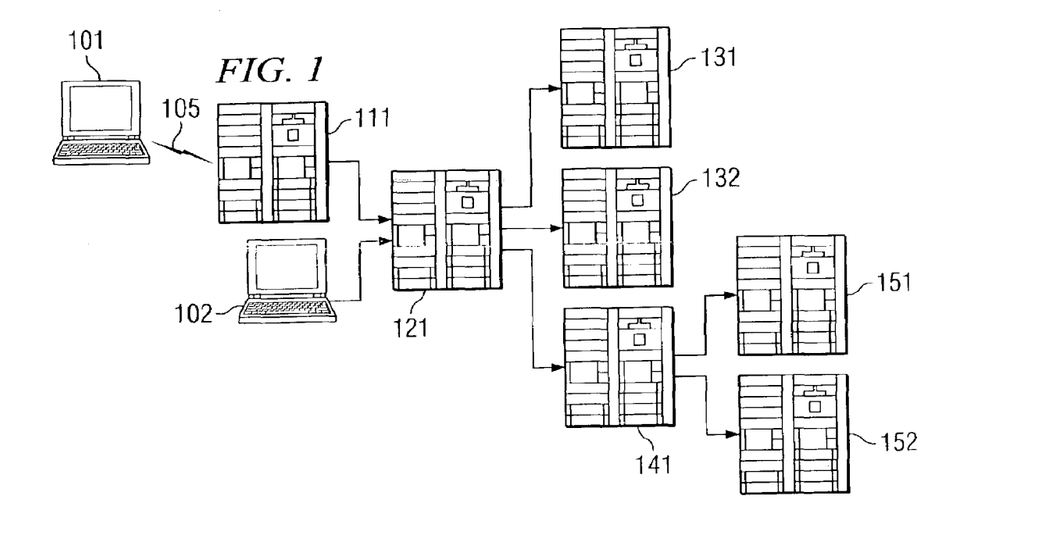

FIG. 1 is a diagram illustrating the various hardware and software platforms, which may be utilized in one exemplification of the practice of the invention. Illustrated are two end user clients, 101 and 102, one, 101, connected to a data server, 121, through the World Wide Web, 105, and a web server, 111, and the other connected to the data server, 121, through a local area network. The web server, 111, is connected to two relational database management systems, 131, 132, and to an extended search server, 141, which is in turn connected to two unstructured database servers, 151 and 152. The unstructured database server, 151 or 152, may contain one or more unstructured databases, and may alternatively, be web clients, where still further web server-data server combinations contain the unstructured data to be searched.

Figure 2:
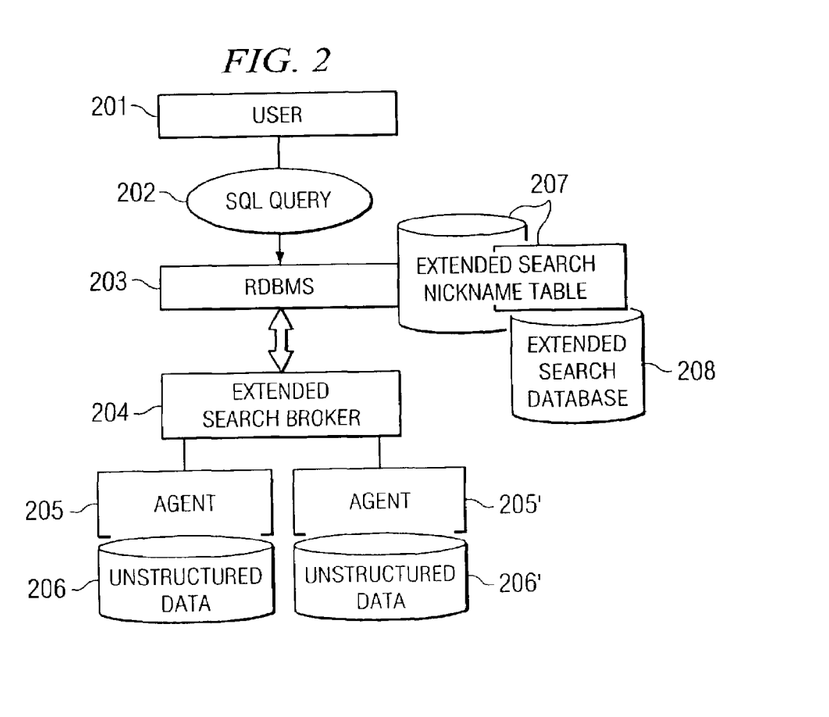
FIG. 2 illustrates the various elements of the method and system of the invention, with a user entering an SQL query to a relational database management system. The relational database management system is a federated relational database management system, and searches unstructured data using an extended search system with an extended search broker and agents. The results are accessed through an extended search nickname table and an extended search database.

FIG. 2 is a diagram illustrating the various elements of the method and system of the invention, with a user, 201, entering an SQL query, 202, to a relational database management system, 203. The relational database management system, 203, is a federated relational database management system, and using an unstructured data search system with an extended search broker, 204, and agents, 205 and 205', searches unstructured data, 206 and 206'. The results are stored in an extended search nickname table, 207, and an extended search database, 208.

Figure 3:
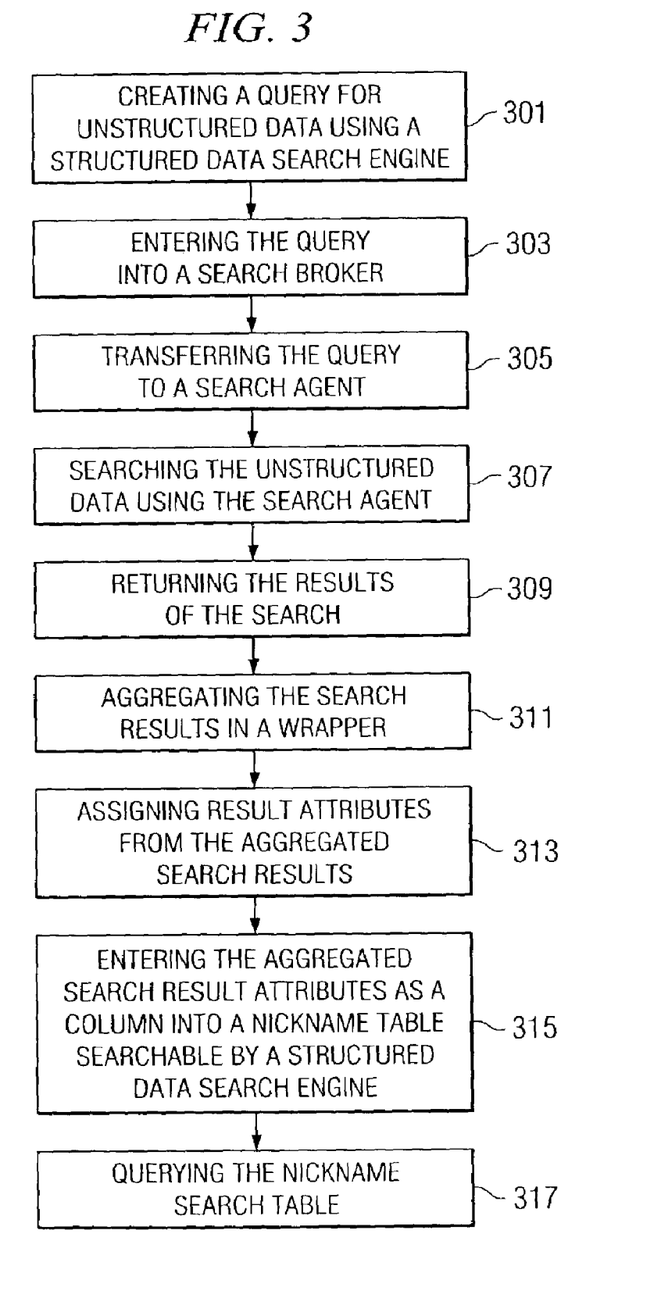
FIG. 3 illustrates a method of carrying out the query process by creating a query for unstructured data using a structured data search engine. The structured data search engine enters a query into an extended search broker. The extended search broker then transfers the query to a search agent, which searches the unstructured data, and returns the results of the search, aggregating the search results in a wrapper. Results attributes are assigned to the wrapper, and the attributes are entered into a nickname table that is searchable by a structured data search engine. The structured data search engine then queries the nickname search table.

FIG. 3 illustrates a method of carrying out the query process by creating a query for unstructured data using a structured data search engine, 301. The structured data search engine enters the query into the unstructured search system including the extended search broker, 303. The extended search broker then transfers the query to a search agent, 305, which searches the unstructured data, 307, and returns the results and the result attributes of the search, 309, aggregating the search results and result attributes in a wrapper, 311.

Result attributes are assigned to the wrapper, 313, and the results attributes are entered into a nickname table that is searchable by a structured data search engine, 315. The results attributes are entered into a nickname table as a column therein. The structured data search engine then queries the nickname search table, 317, and returns the query results to the requester.

By integrating federated database and extended search technologies as described herein, several benefits are realized. First, unstructured data from a diverse set of data source types is made available in real time to the RDBMS engine through loading, including just-in-time loading, of the extended search engine nickname tables. Data presented to the structured database search engine (the relational database management system) is now current and up-to-date. While other federated wrappers provide current data for a single source, only the extended search engine wrapper enables this capability for multiple data sources at a time. In this way the data received by the extended search engine wrapper is presented as a single normalized data set even though multiple sources were involved in its formation.

A second benefit is that the data remains distributed throughout the enterprise logically closest to where the work is performed. The extended search engine, and not the relational database engine, is responsible for the searching of thousands of data sources stored in different locations. The extended search wrapper used in conjunction with the extended search broker acts as a gateway to this vast amount of unstructured information.

A third benefit is the ability to apply relational concepts against the aggregate of unstructured information. With an extended search engine alone it is not possible to relate results received from one source with other discrete sources in order to derive a subordinate results set. For example it is not possible to join together data from different sources based on matching field values. Extended search engines only perform aggregation on the returned data to produce a single result set. But, once the data is made available to the nickname table through the extended search engine wrapper, the data is free to be joined by the RDBMS engine with any other table in the database, including other nickname tables.

This capability has profound implications. By configuring a nickname table for each of the different types of data that can be retrieved by extended search engines using concepts of our invention, it is now possible to use the power of the relational engine to easily integrate that data outside of its hosting software.

Illustrative Example

By way of example, suppose an intelligence agency is trying to identify individuals who might be potential terrorists. Given that this agency has access to a diverse set of sensitive sources, they may want to pose the following question: "List the names of those persons who have obtained a visa within a certain time frame, have purchased large quantities of fertilizer since those dates, have corresponded through e-mail with other individuals about bomb fabrication, and have applied for a class B (truck) drivers license."

The sources that need to be searched are many and have varying degrees of structure. Each source, however, has the notion of a person (identified by name) that can be used to perform the join. An extended search system would be used to perform the brokered searches to the remote data sources and return the appropriate data but would then rely on the relational engine to perform the join. In order to do the join, the data needs to be organized into separate nickname tables—one for each type of data source being searched.

The example above requires four nickname tables. One nickname table would be configured to represent e-mail results, another nickname table would represent drivers license information, another would represent fertilizer purchases, and another visa applications. Each nickname table is associated with one or more extended search sources that are similar in purpose. For example, queries applied to the drivers license nickname table would, in reality, cause an extended search of fifty Motor Vehicle Administration data sources (one for each state).

It is assumed that each nickname table would contain a foreign key for the person's name on which the join could be performed. Extended search field mapping would be used to normalize the foreign keys in the nickname tables with the syntactical differences encountered in the backend sources (more on this later). Given that the four nickname tables are configured in this fashion it would now be possible to pose the following query in SQL:

TABLE

VISA

| FirstName | LastName | Date | CountryFrom |
|---|---|---|---|
| Bill | Stalwart | Sep. 05, 2001 | Germany |
| Mary | Boutreaux | Jul. 21, 2001 | France |
| Ali | Mohammed | Sep. 10, 2001 | Iraq |

TABLE

Driver

| FirstName | LastName | Date | Class | State |
|---|---|---|---|---|
| Bill | Stalwart | Sep. 05, 2001 | A | MD |
| Mary | Boutreaux | Jul. 21, 2001 | A | NY |
| Ali | Mohammed | Sep. 10, 2001 | B | CA |

TABLE

Mail

| From | To | Date | Body |
|---|---|---|---|
| Bill Stalwart | Sally Cruthers | Sep. 05, 2001 | Text of email |
| Don Crition | Martin Jones | Sep. 05, 2001 | Text of email |
| Ali Mohammed | Mark Billsman | Sep. 05, 2001 | Text of email |

TABLE

Purchases

| FirstName | LastName | Date | Description | Amount |
|---|---|---|---|---|
| Bill | Stalwart | Sep. 05, 2001 | Refrigerator | $673.00 |
| Ali | Mohammed | Sep. 05, 2001 | Fertilizer | $2230.00 |

```
SELECT      N1.FirstName, N1.LastName
FROM        INS as N1,
            DRIVER as N2,
            EMAIL as N3,
            FERTILIZER as N4
WHERE           ES_SEARCH(N1.DOC_RANK, 'DATE_OF_ISSUE >=
"01/01/2000"') = 1 AND
                ES_SEARCH(N2.DOC_RANK, 'LICENSETYPE = "B"')     = 1
AND
                ES_SEARCH(N3.DOC_RANK, 'DOCUMENT TOKEN "bomb" and
                    DOCUMENT TOKEN "fabrication"') = 1
AND
                ES_SEARCH(N4.DOC_RANK, 'ProductType = "FERTILIZER" and
                    Quantity > 500 and
                    Date > "01/01/2000"')          = 1
AND
            N1.LastName = N2.LastName AND
            N2.LastName = N3.LastName AND
            N3.LastName = N4.LastName
```

As previously mentioned Extended Search has the ability to map a common field name to one or more semantically equivalent but syntactically different fields on the backend. This can be very useful in producing a meaningful data model from the nickname tables.

For example, the symbolic identifier for person name in the fifty drivers license databases would most certainly be different—especially since the states are free to build their own MVA databases. Through Extended Search a single field for licensee name could be defined and mapped to the appropriate native fields in the drivers license databases. The single mapped field for licensee name would then be used in the drivers license nickname table. Without this mapping feature, you would be forced to define a nickname column for each uniquely defined name field in the backend database. The table would grow horizontally with many columns and would not be in 3rd normal form. The table would be sparsely populated since any one row would have only one name column filled in at a time.

There are applications however that can make use of a large number of fields coming from many discrete data sources. For these applications the relationships among the data (particularly unstructured data) are not known ahead of time thus making it very difficult to define and structure the nickname tables. Extended Search can support this type of application by populating what is referred to as a vertical nickname table.

A vertical nickname table contains four predefined columns. They are: field name, field value, field type, and source name. Rather than using mapped fields as recommended in the previous example, you do the reverse by letting Extended Search return the native field name/value pairs. Meta data such as the type of field (e.g. date, integer, etc . . . ) and the source from where it came is also returned. Now the nickname table is densely populated with many rows of data—one row for each field per data source.

But how might these vertical nickname tables be used in the relational model? Suppose that the same intelligence agency were to ask a series of questions that helped them discover useful relationships among the data regardless of where it came from. They have set up an extended search system to query over a thousand data sources of varying types each with their own data models and sets of fields. Not knowing which fields will be relevant in your search you configure extended search to search and return all of the fields. These fields are returned in the vertical format just described.

Now the intelligence agency can use the relational engine for the discovery and analysis of the data relationships themselves. They might ask for all fields that contain the word "fertilizer" ordering the result by data source name.

Federated Relational Database Management Systems

A federated database management system, also referred to as a federated database system or federated system is a system where each database server is an autonomous and independent centralized DBMS that has its own local users, local transactions, database administrator, and, therefore, a high degree of local autonomy. In a federated database management system, each individual server can authorize access to specific portions of its database by specifying an "export schema" which specifies portions of its database that can be accessed by specific sets of non-local users, and the specifications that these non-local users have. In a federated database management system, a user is essentially an additional interface to several local database management systems, thereby allowing a global user to access multiple local, autonomous databases.

A federated database management system, such as IBM DB2 Universal Database federated system, supports applications and users submitting SQL statements referencing two or more DBMSs or databases in a single statement. An example is a join between tables in two different DB2 databases. This type of statement is called a distributed request.

A DB2 Universal Database federated system provides support for distributed requests across databases and DBMSs. A user can, for example, perform a UNION operation between a DB2 table and an Oracle view.

A federated database management system, such as an IBM DB2 federated system, provides location transparency for database objects. If information (in tables and views) is moved, references to that information (called nicknames) can be updated without any changes to applications that request the information. A further aspect of a federated database management system is compensation for data sources that do not support all of the particular SQL dialects, artifacts, or certain optimization capabilities of each other. Operations that cannot be performed under such a DBMS (for example, a file system that may not be able to implement a GROUP BY clause) are run under DB2.

A federated system functions in a semi-autonomous manner, that is, IBM DB2 queries containing references to Oracle objects can be submitted while Oracle applications are accessing the same server. A federated system does not monopolize or restrict access (beyond integrity and locking constraints) to other objects on the remote data sources.

In the case of the IBM DB2 Universal Data Base federated system, the system consists of the IBM DB2 UDB instance, a database that will serve as the federated database, and one or more data sources. The federated database contains catalog entries identifying data sources and their characteristics. A data source consists of a DBMS and its data. Applications connect to the federated database just like any other database.

Federated database catalog entries contain information about data source objects: what they are called, what information they contain, and conditions under which they can be used. Because the federated database catalog stores information about objects in many data sources, it is called a global catalog. Object attributes are stored in the catalog. The actual data sources being referenced, modules used to communicate with the data source, and DBMS data objects (such as tables) that will be accessed are outside of the database. In this regard it should be noted that the one exception is a federated database can be a data source for the federated system. Specifically, IBM DB2 supports federation over remote data sources and remote DBMS's.

Federated objects can be created using, for example, the IBM DB2 UDB Control Center, or SQL Data Definition Language ("DDL") statements. As a general rule, the required federated database objects are wrappers, servers, and nicknames. Wrappers identify the modules (DLL, library, and so on) used to access a particular class or category of data source. Servers, in this context, define data sources. Server data includes the wrapper name, server name, server type, server version, authorization information, and server options. Nicknames are identifiers stored in the federated database that reference specific data source objects (tables, aliases, views). Applications reference nicknames in queries just like they reference tables and views.

After a federated system is set up, the information in data sources can be accessed as though it were in one large database. Users and applications send queries to-one federated database, which then retrieves data from DB2 family and Oracle systems as needed. User and applications specify nicknames in queries; these nicknames provide references to tables and views located in data sources. From an end-user perspective, nicknames are similar to aliases.

Many federated system operate under some restrictions. For example, distributed requests may be limited to read-only operations. In some federated systems utility operations (LOAD, REORG, REORGCHK, IMPORT, RUNSTATS, and so on) cannot be executed against nicknames. However, a requester can use a pass-through facility to submit DDL (Data Definition Language) and DML (Data Manipulation Language) statements directly to database managers using the SQL dialect associated with that data source.

Federated systems tolerate parallel environments. Performance gains are limited by the extent to which a federated database query can be semantically broken down into local object (table, view) references and nickname references. Requests for nickname data are processed sequentially; local objects can be processed in parallel. For example, given the query SELECT*FROM A, B, C, D, where A and B are local tables, and C and D are nicknames referencing tables at Oracle data sources, one possible plan would join tables A and B with a parallel join. The results are then joined sequentially with nicknames C and D.

Extended Search Engines and Extended Search Applications

An extended search engine "extends" the standard capabilities of other search products by allowing an end user to search and retrieve all types of information, not just data that is managed by the hosting software. For example, using a standard web browser, an end user can easily and quickly locate and review information contained in thousands of data repositories that are spread throughout the organization. These repositories may be of varied content and structure, and they may be geographically dispersed throughout the world.

With a single query, the end user can search internal and external web sites, full text indexes, Microsoft indices, document management systems, e-mail systems, file systems, relational databases, LDAP directories, and the full complement of Lotus databases—simultaneously. An extended search engine can be thought of as a brokered agent working on the user's behalf: it searches each of the data stores in their native form, and returns results in a single aggregated results set.

The extended search engine shields an end user from data source diversity. This is because an end user interacts with a single, generally function-rich, extended search engine interface that transparently distributes the end user's search to potentially thousands of diverse and disparate data stores. Results can be presented in a variety of ways.

With an extended search, an end user experiences more than what the end user might have come to expect from a typical search application. An end user discovers that his or her reach has been extended further into the enterprise, and that he or she can access information not easily attainable before.

Almost all search systems involve the use of an index that catalogs the information to be searched. Without an index, the time to perform the search would be greatly exaggerated—much like trying to find a book in a library without a card catalog. But while most search solutions require an end user to re-index the information into a new index, an extended search engine, such as IBM Lotus Extended Search, leverages an enterprise's current data management investment.

Note that enterprise information usually exists in many shapes and forms, is distributed throughout the enterprise, and is generally managed by the task specific software for the task at hand. An extended search engine, such as IBM Lotus Extended Search, taps into this maze of data sources and modes of data access, and treats the existing collection as one virtual index with a single point of entry.

Regardless of the mode of entry, an extended search engine translates the query into the native search languages of the target data sources and uses the search and retrieval methods that are native to each data source to return results.

One thing to recognize is that backend data sources are not created equal, however, and they can have totally divergent architectures, methods, schema, metadata and capabilities (such as full text indexes vs. relational databases vs. e-mail systems). Extended search tools and engines attempt to minimize these disparities whenever possible and achieve more than the least common denominator effect.

For example, in querying multiple data sources, an extended search engine, such as IBM Lotus Extended Search, might combine two or more operations against one data source to achieve what can be done in a single operation on a different source. This approach enables users to search multiple data sources, of differing types, architectures, structures, capabilities, and formats, in parallel with a single query. By this expedient it is possible to maintain the mechanisms of the native database or search engine and preserve the integrity and currency of the information, while avoiding the duplication of dispersed data into a centralized index (reducing overall storage requirements and eliminating costs and overhead of re-indexing resources. Moreover, the data remains in close (logical and virtual) proximity to the work that is being performed, and the respective data specific and task specific data sources and search engines can perform search operations in parallel, thereby improving search response times.

The extended search engine paradigm also offers greater scalability than multiple data source paradigms built around a centralized index. As the number of documents in a domain grows, so does the time it takes to index the information. It is not uncommon for the indexing of large domains to make the search impractical.

In this situation, the power of an extended search engine complements depth of the index: first, stabilizes the index at its maximum capacity, and then searches the index in conjunction with other data stores. With this approach, an end user have the option of indexing only what needs to be indexed while using the extended search engine to search both indexed and non-indexed sources.

Connecting new sources to the search domain results in little overhead being incurred by the extended search engine, and it is insignificant when compared to the expense of the actual search operations themselves. Because the search is executed on one or more machines that already exist in a network (including an internet or intranet) using existing search operations, the incremental cost of connecting new sources is negligible.

The extended search engine implements a strategy for accessing all of an enterprise's information wherever it happens to be located by using the enterprise's existing data management software. With this strategy comes the inherent fact that not all backend data sources are created equal. There are general areas in which most systems vary with respect to search and retrieval. Building on these commonalities, an extended search engine offers a common ground that enables system implementers to work complementarily within these areas of (1) Search language, that is, how the query is expressed; (2) Data model support, that is, how the data is organized, related, and represented, and (3) Application program interface (API) support, that is, how information access is performed.

With respect to the search language, nearly all data management systems employ a grammar or query language of some kind to express the criteria of a search. These grammars can vary widely depending on the structure and composition of the data. For example, in a free text system such as the web, for example, the search is generally expressed as a list of keywords. Additional notations are used to express boolean conditions (and, or, not) or positional information, such as specific words that must occur within the same sentence or paragraph. By way of comparison and contrast, if the data is highly codified and structured, the grammar may be more parametric and may support fielded operations (for example, the value of the Quantity field is greater than 100).

Clearly, it is impractical for a user to know the syntax of the entire set of search grammars used in an extended search. It is much more practical to let the user express the query in a single common search language. In IBM Lotus Extended Search the common language is the Generalized Query Language (GQL). It may be treated as a superset of search grammars from which most queries can be expressed.

All IBM Lotus Extended Search queries are expressed internally in GQL format (with the exception of "pass through" queries which will be discussed shortly). When the GQL expression arrives at a specific data source, Extended Search transforms it into the native query language of that source. This translation process maps the lexical elements of GQL to equivalent elements of the native grammar.

While the fullness of the GQL grammar is supported by all components of IBM Lotus Extended Search, not all backend search engines are capable of supporting all elements of the GQL grammar. When an extended search engine, such as IBM Lotus Extended Search, encounters these disparities, it tries to compensate by combining two or more native operations to achieve the same effect. Only after the extended search engine has exhausted all alternative methods will it ignore the non-supported portion of the expression. Under these circumstances, an end user can instead pass through a query that does not get translated.

Common Data Model

Just as search grammars can vary with each dissimilar backend system, so can the data models used to organize and store information. The data model used by a particular data management system is typically designed for the class of applications it serves. This determines the amount of structure and granularity found in its information.

For example, free text systems tend to use a loosely structured document model with low data granularity. A document may consist of a few fields (such as title, author, and body) but its text remains free in form and unstructured. By comparison, information can be highly structured, such as that found in relational databases. Here, data is organized into rows and columns that can be related in any number of ways, which results in high data granularity.

A modern extended search engine, such as IBM Lotus Extended Search, normalizes this diverse set of data models into a single model, one that is easy to understand and usable by most search applications. The search application designer need only contend with this one conceptual model of the data and not be confounded by the many.

Typically a source maps to a database in the conventional sense but can just as easily be mapped to a web site, a directory in a file system, or a node in an LDAP hierarchy. Likewise, a document maps conveniently to those systems that are text based but could just as easily represent an instance of data, such as a row in the table of a relational database.

A common problem encountered when relating data sources of different types is the mismatch in field labels. For example, an author's name might be labeled AUTH_NAME in one data source and CREATOR in another, and yet be represented as three fields (such first name, middle initial, and last name) in another.

An important feature of the common data model is the ability to define mapped fields. A mapped field is a composite of one or more native fields. To resolve the ambiguity in the previous example, an end user could define a single mapped field with the label AUTHOR. An end user could then map this field to one or more native fields in each of the data sources that support the semantic of author's name.

The benefits of this feature are compelling when used in the search expression. A user needs only to specify the mapped field in the query. IBM Lotus Extended Search will automatically associate the mapped field to the correct native fields on the backend. This approach greatly simplifies the query expression, and provides greater benefit as the number of data sources increases.

To illustrate this feature, consider the case of an application that is to display a barometer that is calibrated to reflect the age of a document (that is, more recent documents would have a higher barometer reading). If the "date created" field were labeled differently in each of the backend sources then the application would need an exhaustive set of conditional statements, one for each discrete date field name. But, with mapped fields, only one mapped "date created" field needs to be identified for retrieval and subsequently tested. By referencing this single mapped field, the result would contain the correct date value as it correlates to the source's native date value.

On the other hand, if the result came from an e-mail system, an end user might want to return the date, subject, and author. These semantically different data fields can be selectively retrieved using their native source field identifiers. When the native field label is too cryptic for display purposes (for example, $Doc_Abstract), then a mapped field could again be used as an alias for the native field name (for example, Document Abstract).

A further aspect of an extended search engine is the provision for common API's. The common API's answer the question of "How do I interact with all of these different backend systems to search and retrieve their managed information ?" The API to each backend system can vary dramatically by calling methodology, syntax, semantics, and programming language. The functions issued through an extended search engine common interface are translated automatically by the system into the native methods of the backend system—much like the process of translating GQL into the native search grammar.

Extended search engine seek to interface with each of the different mechanisms on the backend in the best way possible to achieve optimum parity between all data sources while respecting the operating policies of each native search API. By using the published API of the hosting software, the integrity and security of the data source is preserved.

To achieve this communicability, a link module is created for each type of backend data source and is used to encapsulate all of the native API calls required for that type.

An agent-based technology is used to apply these link modules to their respective data sources. Agents work on behalf of a brokered search and are generally transparent (links and agents will be discussed in more detail later on). From a designer's perspective, an end user is interfacing with one searchable backend system through a single API.

In the case of the IBM Lotus Extended Search, the common API is available in two forms. The first and most flexible is a Java bean interface. With this method the beans are combined with the power of the Java programming language to develop a broad range of simple to highly complex and specialized search and retrieval applications. The product demonstrates the use of these beans in a sample web application that uses JavaServer Pages (JSPs).

Alternatively, a set of HTML-like tags that allow an end user to embed extended search engine functionality into new or existing web pages may be used. These easy to use tags empower a web master and enable users to enter queries that specify a variety of search options. An end user can embed extended search engine tags anywhere within a web page—they do not interfere with the surrounding HTML tags.

The search results from an extended search application can be presented in a variety of ways. As part of configuring the system, the system can be programmed and configured to determine which fields a user is allowed to query, view on the results page, and retrieve from the data source. The user is presented with a single, consolidated page containing results from multiple sources. The list is pre-pruned for relevancy, thus ensuring that the user sees the best matches first.

Extended search systems are characterized by scalability. Specifically, the distributed component architecture of an extended search system, such as IBM Lotus Extended Search, offers the flexibility to scale a system according to changing requirements. It also allows the extended search engine components to be arranged in a topology that matches the environment, enabling an end user to blend IBM AIX, Sun Solaris, Windows 2000, and Windows NT platforms as needed.

Exemplary Scalable Extended Search Architectures Include:

Vertically, within a single extended search server, an end user can configure multiple instances of server processes to influence the number of simultaneous requests that the server can process.

Horizontally, with multiple machines, an end user can set up additional extended search servers and additional web servers. For each extended search server, an end user can determine the types of server tasks an end user want to run. By having multiple servers, an end user can distribute and balance the processing load.

Extended Search Architecture

The huge economic growth experienced toward the end of the Twentieth Century has been attributed to the advances made in information technology and to those companies that invested in it. Because the technology was (and still is) changing at break neck speeds, companies frequently invested and then reinvested their Information Technology ("IT") budgets into ever evolving products to manage their information.

More often than not, the result has been islands of information distributed throughout the organization—highly specialized for the task at hand, but not easily accessible on an enterprise wide basis. Even if a company were able to dictate a common IT policy for the enterprise, it could be thwarted by the single acquisition of a company that employs a different IT architecture.

An extended search engine of the type herein contemplated, and exemplified by IBM Lotus Extended Search, has a multi-tiered design. For example, the IBM Lotus Extended Search system employs a four-tiered architecture. Messages start from search applications in the first tier and proceed consecutively through subsequent tiers to the backend. In most cases, the backend is a third-party data source to which IBM Lotus Extended Search is connected but it can also be the Extended Search configuration database (CDB), a private backend that is managed by a relational database management system, such as IBM DB2 RDBMS.

Message flows between the tiers can be divided into two basic categories:

Run Time messages, which are messages usually issued by the user community to perform searches and retrieve documents.

Administrative messages which are issued by the Administrator and result in updates to the configuration database.

Links are the software modules that encapsulate the native API calls for search and retrieval to a specific data management system. They contain all of the required data structures, programming objects, and procedural logic necessary to interface with the backend data system.

A link module is uniquely assembled to support (at a minimum) callable methods that typically exist in all data management systems:

Methods to connect to and disconnect from the host system

Methods to search content and retrieve data from the system

The link module performs a null operation for those methods that are not supported by the backend source. For example, a file system search does not support the concept of connecting and disconnecting.

Translators are the software modules responsible for translating the incoming GQL expression into the native search grammar of the backend data system. They, too, contain all of the required data structures, programming objects, and parsing logic necessary to generate a syntactically correct search expression.

In some cases, the same translator module applies to several different backend systems, as is the case for the SQL translator and the many varied systems that support the standard SQL grammar.

Agents are programs that respond to search and retrieval operations targeted against a particular data source. The agent loads the appropriate link and translator modules when a request against a specific data source type is first made. The agent then calls upon these module libraries for translation (XLAT), connect, disconnect, search, and retrieval operations.

For search operations, an agent will sort the results set by relevance rank and then truncate the set to the maximum number of hits, as specified in the original search request. This sorting and subsequent pruning of the list of hits is an important precursor to aggregation, which will be discussed shortly.

Agents can reside on the same machine as the data source (recommended) or use a data source's remote APIs for access. More than one copy of an agent can run on a single computer to handle concurrent search and retrieval requests. An agent can be dedicated to a single data source, a group of sources of a particular type, or a range of sources that have a mixture of link requirements.

Brokers are intermediary components that exist between the requesters of service and the agents that actually perform the service through the backend. They function as special purpose resource coordinators designed to manage the multitude of searches generated from a single request—as caused by a category search for example.

A broker typically performs the following tasks:

Validates the request.

Expands categories to obtain a list of the data sources available to the application and resolves the source addresses. (Label 1)

Distributes queries to agents for efficient, parallel searching. (Label 2)

Aggregates and optionally sorts search results that are returned by the various agents into a single search result set. (Label 3)

Caches search results for subsequent paging operations. (Label 4)

Issues requests to agents to retrieve source documents for the user (note that in most cases, the web browser uses the URL returned in the results list to retrieve the document).

Honors timeouts and response options.

The degree of responsiveness can vary dramatically from a large set of backend systems contributing to a single request. Some data management systems respond faster than others, and some not at all—possibly due to out of service conditions. To account for this situation, brokers were designed to communicate asynchronously with their agents.

To support performance and scalability, an extended search system may contain multiple brokers. This ability to establish a hierarchy of brokers, along with the ability to set up agents co-resident with the sources they support or to dedicate agents to particular sources or types of sources, provides an extended search system, such as IBM Lotus Extended Search, with endless flexibility with regard to changing and expanding environments. Under a multiple broker schema, sources get partitioned across all of the brokers, a design that prevents any one broker from being overwhelmed.

In a single broker environment, a search that targets six dozen sources would result in 72 queries being sent to the remote machines and 72 sets of search results being returned to the broker. If each result set contains the maximum number of results, most of the data will be discarded when the broker consolidates and aggregates the data for the list being returned to the requester (the broker prunes the results and keeps only the top items, up to the maximum number allowed by the search application).

With multiple brokers, an entry broker sends a single message to brokers on remote machines. The remote brokers then split the message into multiple requests for the sources (fronted by agents) on their respective machines. Instead of all result sets being returned to one broker, each broker consolidates, aggregates, and prunes the results returned by its agents, and then returns just a single list—containing the top hits—to the entry broker. The entry broker only needs to create a final results set from its own local sources and the consolidated lists returned by the remote brokers.

The broker obtains information about the resources it is to manage from the extended search application's configuration database. This database contains information about data sources and how they should be searched. It also stores network addresses, saved queries, saved search results, and data that was downloaded by a web crawler.

An end user can easily update information about a network topology, data sources, and search applications by using an intuitive Administration interface. This interface also provides the gateway through which an end user can run discovery (discussed below), view error message and event data, schedule queries, and work with saved queries and search results.

While the invention has been described with respect to certain preferred embodiments and exemplifications, it is not intended to limit the scope of the invention thereby, but solely by the claims appended hereto.

We claim:

1. A method of searching unstructured data in a computer system comprising an unstructured data system and a structured data system, comprising:
    a. searching the unstructured data through an extended search broker and a search agent for unstructured data searching;
    b. returning search results having attributes for aggregation from the search agent to the extended search broker;
    c. aggregating the search results;
    d. returning the aggregated search results to a wrapper configured to enter attributes of the search results into a nickname table; and
    e. entering the search results attributes in a nickname table using the wrapper, said nickname table being searchable by a structured data search engine.

2. The method of claim 1 comprising searching the unstructured data with an unstructured data search system comprising an extended search broker and a search agent, said method comprising searching the unstructured data with the search agent, aggregating search results obtained thereby with the extended search broker.

3. The method of claim 2 comprising returning search results from the search agent to the extended search broker for aggregation and transferring the aggregated search results and search result attributes to the wrapper.

4. The method of claim 3 comprising making the search result attributes available as at least one column in the nickname table.

5. The method of claim 1 wherein the nickname table is a relational database nickname table.

6. The method of claim 5 wherein the nickname table is a relational database management system table, the structured data search engine is a relational database management system, and the nickname table is searchable by the relational database management system using a structured query language.

7. The method of claim 6 wherein the structured query language is SQL.

8. A method of searching unstructured data in a computer system comprising an unstructured data system and a structured data system, comprising:
    a. searching the unstructured data with a structured data search engine, an unstructured data search agent, and an extended search broker there between;
    b. returning search results having search results attributes from the search agent to the extended search broker for aggregation; and
    c. entering the search result attributes in a nickname table using a wrapper configured to enter attributes of the search results into the nickname table, said nickname table being searchable by a relational database management system using a structured query language.

9. The method of claim 8 wherein said extended search broker enters the search result attributes into the nickname table.

10. The method of claim 9 comprising entering the search result attributes as a column in the nickname table.

11. The method of claim 9 wherein the structured data search engine queries the search result attributes in the nickname table.

12. The method of claim 9 wherein the structured query language is SQL.

13. A computer system comprising an unstructured data search agent, a structured data search engine, and a nickname table, wherein:
   a. said computer system adapted to initiate a search of unstructured data from the structured data search engine through the unstructured data search agent;
   b. said unstructured data search agent is adapted to receive search results having search result attributes from the unstructured data and aggregate the search results;
   c. said computer system is adapted to enter the search result attributes using a wrapper in the nickname table, wherein the wrapper is configured to enter attributes of the search results into the nickname table; and
   d. said structured data search engine is adapted to search attributes in the nickname table.

14. The computer system of claim 13 wherein the structured data search engine is a relational data base management system search engine.

15. The computer system of claim 14 wherein the relational data base management system search engine is a federated search engine.

16. The computer system of claim 15 wherein the unstructured data search agent includes an extended search broker.

17. The computer system of claim 13 wherein the search result attributes are entered into the nickname table as columns in the nickname table.

18. A computer system comprising an unstructured data search system, a structured data search engine, and a nickname table, wherein a. said computer system is adapted to initiate a search of unstructured data from the structured data search engine through the unstructured data search system;
   b. said unstructured data search system comprises an extended search broker and an unstructured data search agent; said unstructured data search system is adapted to receive search results with search result attributes from the search agent and return the search results with search result attributes to the extended search broker for aggregation and to aggregate the search results and search result attributes;
   c. said computer system is adapted to enter the search result attributes in the nickname table using a wrapper, wherein the wrapper is configured to enter attributes of the search results into the nickname table, and d. said structured data search engine is adapted to search the search result attributes in the nickname table.

19. The computer system of claim 18 wherein the structured data search engine is a relational data base management system search engine.

20. The computer system of claim 19 wherein the relational data base management system search engine is a federated search engine.

21. The computer system of claim 18 wherein the unstructured data search system includes an extended search broker.

22. The computer system of claim 18 wherein the search result attributes are entered into the nickname table as a column therein.

23. A computer program product comprising computer readable code to program and configure a computer system to:
   a. search unstructured data through an extended search broker and a search agent for unstructured data searching;
   b. return search results and search result attributes from the search agent to the extended search broker for aggregation;
   c. aggregate the search results and search result attributes by the extended search broker; and
   d. enter the search result attributes in a nickname table using a wrapper, wherein the wrapper is configured to enter attributes of the search results into the nickname table, said nickname table being searchable by a relational database management system using a structured query language, whereby to search unstructured data.

24. The computer program product of claim 23 wherein the search results in the nickname table are structured data.

25. The program product of claim 24 wherein the search result attributes are columns in the nickname table.

26. The computer program product of claim 23 wherein the structured query language is SQL.

* * * * *